United States Patent
Ye et al.

(10) Patent No.: US 9,747,819 B2
(45) Date of Patent: Aug. 29, 2017

(54) DISPLAY DEVICE

(71) Applicant: SAMSUNG DISPLAY CO., LTD., Yongin, Gyeonggi-do (KR)

(72) Inventors: Sangheon Ye, Cheonan-si (KR); Juhwa Ha, Asan-si (KR); Daehoon Song, Seoul (KR); Jaesuk Yoo, Seoul (KR); Kyu-Hun Shim, Seoul (KR); Donghoon Jung, Asan-si (KR); Hyunwoo Lee, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 287 days.

(21) Appl. No.: 13/734,379

(22) Filed: Jan. 4, 2013

(65) Prior Publication Data

US 2013/0314899 A1    Nov. 28, 2013

(30) Foreign Application Priority Data

May 25, 2012    (KR) ........................ 10-2012-0056378

(51) Int. Cl.
  *G09F 13/04*    (2006.01)
  *G09F 13/08*    (2006.01)
  (Continued)

(52) U.S. Cl.
  CPC .......... *G09F 13/0409* (2013.01); *G09F 13/08* (2013.01); *G09F 13/22* (2013.01);
  (Continued)

(58) Field of Classification Search
  CPC ......... G02F 1/133603; G02F 1/133608; G02F 1/133606; G02F 1/133611;
  (Continued)

(56) References Cited

U.S. PATENT DOCUMENTS 7,213,937 B2 *    5/2007    Tsai .............................. 362/224
7,408,599 B2 *    8/2008    Tsubokura et al. ............. 349/58
(Continued)

FOREIGN PATENT DOCUMENTS

CN    101476703    7/2009
CN    102159883    8/2011
(Continued)

OTHER PUBLICATIONS

Kim, Liquid crystal display device, Sep. 17, 2010, english translation.*

(Continued)

*Primary Examiner* — Jong-Suk (James) Lee
*Assistant Examiner* — James Endo
(74) *Attorney, Agent, or Firm* — F. Chau & Associates, LLC

(57) ABSTRACT

A display device includes first light emitting devices arranged in a line in a protective member, second light emitting devices parallel to and alternately arranged with the first light emitting devices, and optical member supporters in the protective member between the first and second light emitting devices. Each optical member supporter is positioned at a center of a parallelogram defined by two adjacent first light emitting devices and two adjacent second light emitting devices, and each transparent optical member supporter includes a first surface that faces one of the first light emitting devices and a second surface opposite the first surface that faces one of the second light emitting devices. Each optical member supporter includes a plate portion having the first and second surfaces, and a hook portion that extends through the protective member. A width of the plate portion decreases with increasing distance from the hook portion.

18 Claims, 16 Drawing Sheets

(51) Int. Cl.
*G09F 13/22* (2006.01)
*G02F 1/1335* (2006.01)

(52) U.S. Cl.
CPC .. *G02F 1/133603* (2013.01); *G02F 1/133606* (2013.01); *G02F 1/133608* (2013.01); *G02F 1/133611* (2013.01); *G02F 2001/133607* (2013.01); *G02F 2201/54* (2013.01)

(58) Field of Classification Search
CPC ........ G02F 2001/133613; G02F 2001/133607; G02F 2201/54; G02F 1/133602; G09F 13/0409; G09F 13/08
USPC ........... 362/97.1, 97.2, 97.3, 97.4, 433, 455; 349/58, 60, 61, 155
See application file for complete search history.

(56) References Cited

U.S. PATENT DOCUMENTS

| | | | |
|---|---|---|---|
| 7,604,390 B2* | 10/2009 | Zhang et al. | 362/634 |
| 8,123,390 B2 | 2/2012 | Lee | |
| 8,430,554 B2* | 4/2013 | Hasegawa | 362/634 |
| 8,632,200 B2* | 1/2014 | Takeuchi et al. | 362/97.1 |
| 8,690,371 B2* | 4/2014 | Takeuchi | 362/97.1 |
| 2002/0044437 A1* | 4/2002 | Lee | G02F 1/133604 362/633 |
| 2006/0072299 A1* | 4/2006 | Lai | 362/29 |
| 2006/0171140 A1* | 8/2006 | Bae | 362/29 |
| 2007/0103908 A1* | 5/2007 | Tabito et al. | 362/294 |
| 2008/0106905 A1* | 5/2008 | Zhang et al. | 362/311 |
| 2008/0111949 A1* | 5/2008 | Shibata et al. | 349/64 |
| 2009/0002988 A1* | 1/2009 | Kim et al. | 362/247 |
| 2009/0135331 A1* | 5/2009 | Kawase | 349/58 |
| 2009/0135583 A1* | 5/2009 | Hillman et al. | 362/97.1 |
| 2009/0168401 A1* | 7/2009 | Kwon et al. | 362/97.1 |
| 2009/0256988 A1 | 10/2009 | Kim et al. | |
| 2009/0273920 A1* | 11/2009 | Song et al. | 362/97.1 |
| 2010/0008066 A1* | 1/2010 | Moro | G02F 1/133608 362/97.1 |
| 2010/0073596 A1* | 3/2010 | Jeong | G02F 1/133308 349/60 |
| 2010/0073906 A1* | 3/2010 | Shen | G02F 1/133608 362/97.1 |
| 2010/0134711 A1* | 6/2010 | Park | 349/58 |
| 2011/0134629 A1* | 6/2011 | Kim | 362/97.1 |
| 2011/0187945 A1* | 8/2011 | Kuromizu | 348/790 |
| 2011/0310326 A1* | 12/2011 | Kitada | 349/61 |
| 2011/0317094 A1* | 12/2011 | Takase | G02F 1/133603 349/61 |
| 2012/0002399 A1* | 1/2012 | Lai | F21V 19/008 362/97.4 |
| 2012/0044668 A1* | 2/2012 | Takeuchi | H05K 1/142 362/97.1 |
| 2012/0081634 A1* | 4/2012 | Yokota | G02F 1/133603 349/62 |
| 2012/0262631 A1* | 10/2012 | Kuromizu | G02F 1/133603 348/725 |

FOREIGN PATENT DOCUMENTS

| | | |
|---|---|---|
| CN | 102472448 | 5/2012 |
| JP | 07-064084 | 3/1995 |
| JP | 2006-190722 | 7/2006 |
| JP | 2007-157451 | 6/2007 |
| JP | 2008152101 A * | 7/2008 |
| JP | 2009158193 | 7/2009 |
| JP | 2012-004047 | 1/2012 |
| KR | 10-0277785 | 10/2000 |
| KR | 10-2008-0038879 | 5/2008 |
| KR | 10-0834892 | 5/2008 |
| KR | 10-2008-0061827 | 7/2008 |
| KR | 20090058257 | 6/2009 |
| KR | 10-0921469 | 10/2009 |
| KR | 10-2010-0030334 | 3/2010 |
| KR | 1020100033196 | 3/2010 |
| KR | 10-2010-0101268 | 9/2010 |
| TW | 200821682 | 5/2008 |
| WO | WO 2011070872 A1 * | 6/2011 |

OTHER PUBLICATIONS

Shimizu, Lighting device, display device, and television reception device, Jun. 16, 2011, english translation.*
Shima Kotaro, Back Light Device and Liquid Crystal Display Device, Jul. 3, 2008, English translation.*
English Abstract for Publication No. 10-2010-0101268.
English Abstract for Publication No. 10-2008-0061827.
English Abstract for Publication No. 10-0834892.
English Abstract for Publication No. 10-0277785.
English Abstract for Publication No. 2006-190722.
English Abstract for Publication No. 2007-157451.
English Abstract for Publication No. 07-064084.

* cited by examiner

DISPLAY DEVICE

CROSS-REFERENCE TO RELATED APPLICATION

This U.S. non-provisional patent application claims priority under 35 U.S.C. §119 from Korean Patent Application No. 10-2012-0056378, filed on May 25, 2012 in the Korean Intellectual Property Office, the contents of which are herein incorporated by reference in their entirety.

BACKGROUND

1. Technical Field

The present disclosure is directed to a display device. More particularly, the present disclosure is directed to a display device capable of improving a display quality.

2. Discussion of the Related Art

A liquid crystal display requires a backlight unit to provide light to a display panel since its display panel is not self-emissive.

The backlight unit may include a light emitting diode, which has low power consumption, good color reproducibility, etc. A backlight unit employing a light emitting diode typically includes a plurality of light emitting units to emit light. Each of the light emitting units includes a plurality of light emitting devices connected to each other.

A backlight unit may be classified as an edge-illumination type backlight unit or a direct-illumination type backlight unit according to the position of the light emitting units. The light emitting units included in a direct-illumination type backlight unit are disposed under the display panel.

A non-self-emissive type display device also includes optical members to improve optical characteristics of light emitted from the backlight unit. The optical members are disposed under the display panel. In addition, a non-self-emissive type display device includes a plurality of supporters to support the optical members.

SUMMARY

Embodiments of the present disclosure provide a display device capable of uniformly providing light to a display panel thereof.

Embodiments of the inventive concept provide a display device that includes an optical member, a display panel disposed on the optical member, and a light source disposed under the optical member. The optical member is supported by a plurality of transparent optical member supporters and the light source is accommodated in a protective member.

The light source includes a first light emitting unit and a second light emitting unit. The first light emitting unit includes a plurality of first light emitting devices arranged in a line and the second light emitting unit includes a plurality of second light emitting devices parallel to and alternately arranged with the first light emitting devices.

Each transparent optical member supporter is positioned at a center of a parallelogram defined by two adjacent first light emitting devices of the first light emitting unit and two adjacent second light emitting devices of the second light emitting unit.

The transparent optical member supporter includes a hook portion fixed to the protective member and a plate portion extended from the hook portion. The plate portion includes a first surface facing one of the first light emitting devices and a second surface opposite the first surface facing one of the second light emitting devices.

A width of each the first and second surfaces decreases with increasing distance from the hook portion. The plate portion includes connection surfaces to connect the first surface and the second surface.

The first and second surfaces are aligned parallel with one of the diagonal axes of the parallelogram. The parallelogram defined by the first to fourth light emitting devices may be a rhombus.

The plate portion may include at least one opening formed through the first surface and the second surface. The at least one opening is symmetrical about an imaginary line that divides the first surface and the second surface into two.

Each transparent optical member supporter may further include a supporter portion partially disposed on the surface of the protective member in which the hook portion extends in a direction substantially normal to a plane of the supporter portion.

The hook portion and the plate portion may be spaced apart from each other with respect to the supporter portion.

According to the above, light incident onto the transparent optical member supporter from the first to fourth light emitting devices passes through the transparent optical member supporter. Accordingly, transparent optical member supporters having the above arrangement may reduce a shadow phenomenon occurring around the transparent optical member supporters.

Light generated by the first to fourth light emitting devices is incident to only the plate portion of the optical member. Thus, shadow areas are reduced since the first and second surfaces of the plate portion respectively face the first and third light emitting devices, which are located on a diagonal axis of the rhombus defined by the first to fourth light emitting devices. In addition, the shadow area is brightened.

In addition, a portion of the shadow areas is removed along the diagonal axis that connects the second and fourth light emitting devices, and thus a remaining portion of the shadow areas is reduced.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout.

Hereinafter, exemplary embodiments of the present disclosure will be explained in detail with reference to the accompanying drawings.

Figure 1:
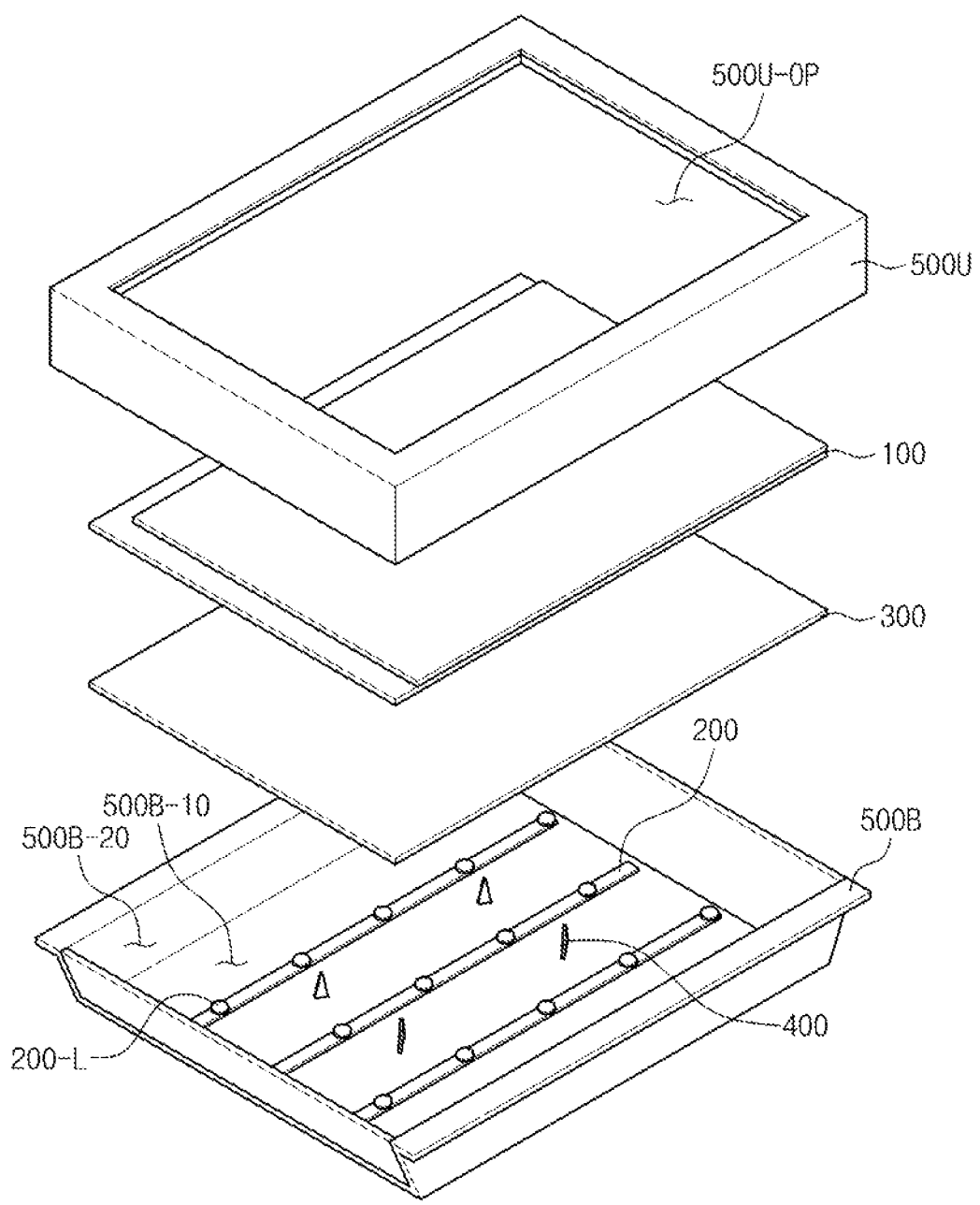
FIG. 1 is an exploded perspective view showing a display device according to an exemplary embodiment of the present disclosure.
Figure 2:
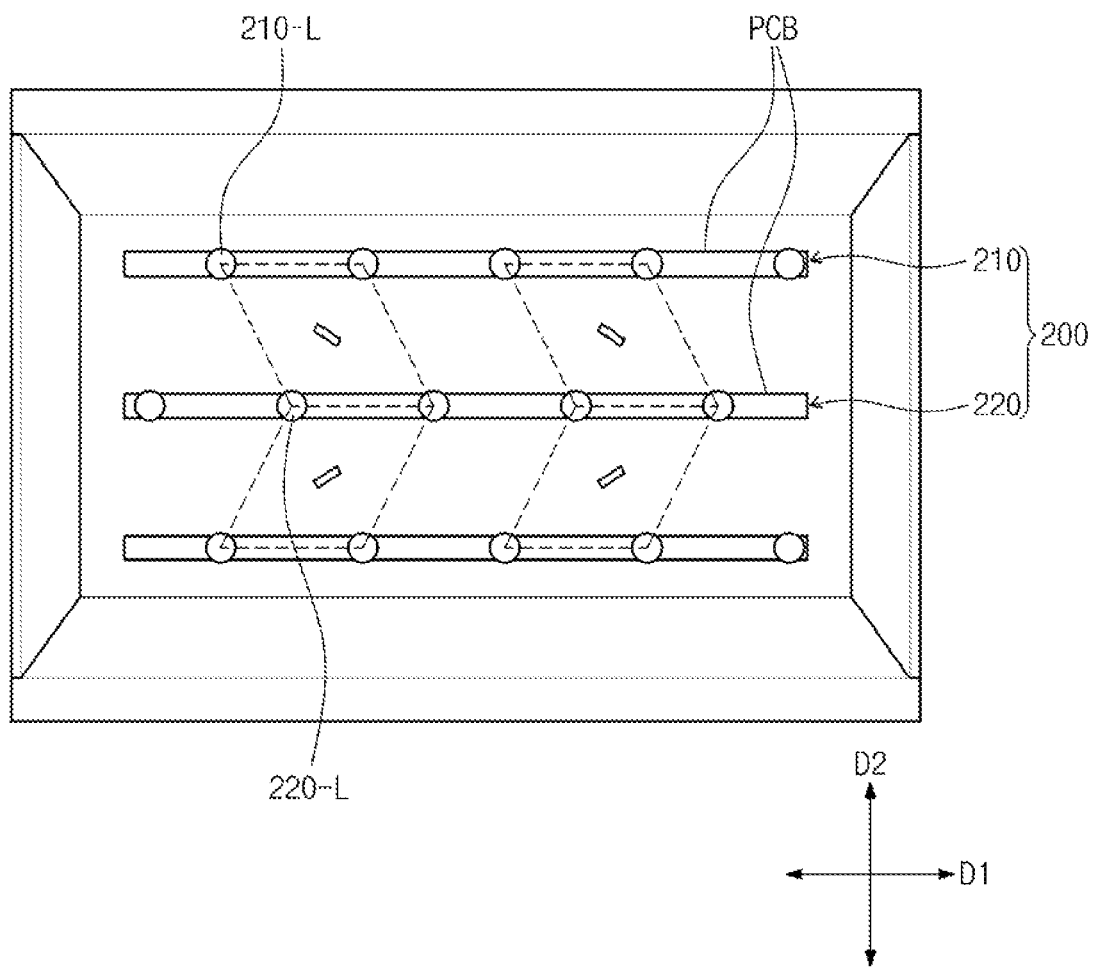
FIG. 2 is a plan view showing a portion of the display device shown in FIG. 1.
Figure 3:
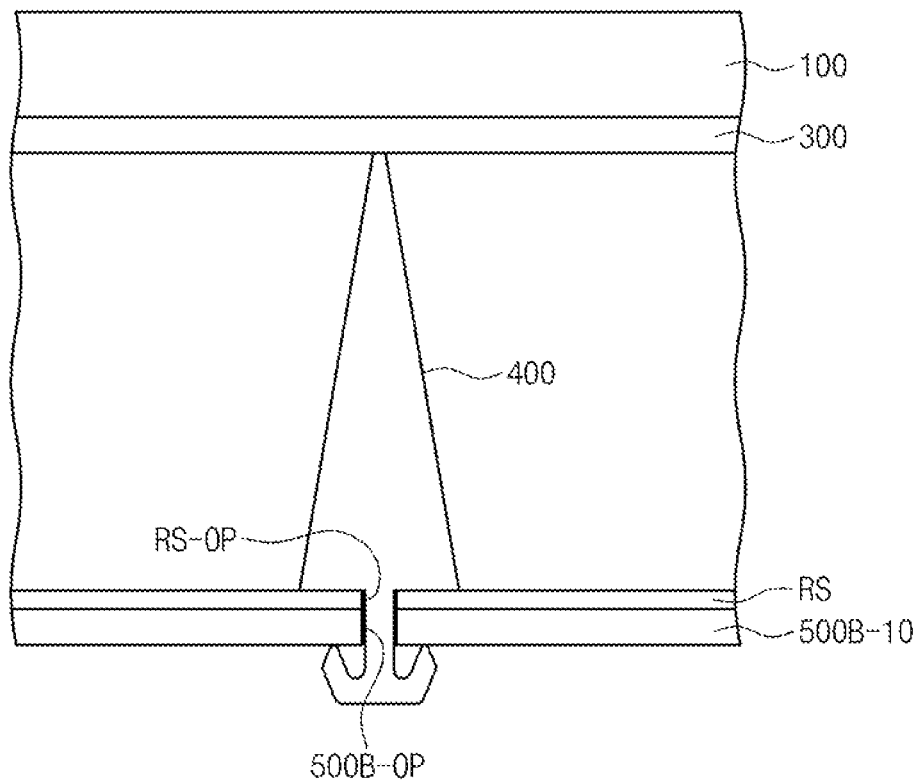
FIG. 3 is a cross-sectional view showing a portion of the display device shown in FIG. 1.

FIG. 1 is an exploded perspective view showing a display device according to an exemplary embodiment of the present disclosure, FIG. 2 is a plan view showing a portion of the display device shown in FIG. 1, and FIG. 3 is a cross-sectional view showing a portion of the display device shown in FIG. 1.

Referring to FIG. 1, a display device includes a display panel 100, a light emitting unit 200, an optical member 300, and optical member supporters 400. The display panel 100, the light emitting unit 200, the optical member 300, and the optical member supporters 400 are protected by a first protective member 500B and a second protective member 500U. A plurality of light emitting units 200 may be provided.

The display panel 100 is not a self-emissive display device. The display panel 100 receives light from the light emitting unit 200 to display an image. The display panel 100 may be one of various display panel types, such as a liquid crystal display panel, an electrophoretic display panel, an electrowetting display panel, etc.

In a case when the display panel is a liquid crystal display panel, the display panel 100 includes a first substrate, a second substrate facing the first substrate, and a liquid crystal layer disposed between the first substrate and the second substrate. The liquid crystal display panel includes a display area and a peripheral area surrounding the display area. The image is displayed in the display area but not in the peripheral area adjacent to the display area.

The light emitting unit 200 is disposed under the display panel 100 to provide the display panel 100 with light. The light emitting unit 200 includes a plurality of light emitting devices 200-L each of which may be a point light source. Each of the light emitting devices 200-L may be configured to include a light emitting diode. Four light emitting devices 200-L may be arranged into a quadrangle and the optical member supporters 400 may be located at a center of the quadrangle. In the exemplary embodiment of the present disclosure, the quadrangle may be a parallelogram.

Referring to FIG. 2, the light emitting unit 200 includes a first light emitting unit 210 and a second light emitting unit 220.

Each of the first and second light emitting units 210 and 220 includes light emitting devices. The light emitting devices included in the first light emitting unit 210 are referred to as a first group of light emitting devices 210-L and the light emitting devices included in the second light emitting unit 220 are referred to as a second group of light emitting devices 220-L.

Each of the first group of light emitting devices 210-L and the second group of light emitting devices 220-L are mounted on a printed circuit board PCB. The printed circuit board PCB includes wires to transmit electrical signals.

The light emitting devices 210-L of the first group are arranged in a first direction D1 in a line. The light emitting devices 210-L of the first group are arranged at regular intervals. The first group of light emitting devices 210-L may be turned on or off substantially simultaneously.

The second light emitting unit 220 is spaced apart from the first light emitting unit 210 in a second direction D2 substantially perpendicular to the first direction D1. The light emitting devices 220-L of the second group are arranged in the first direction D1 in a line. The light emitting devices 220-L of the second group are arranged at regular intervals. The second group of light emitting devices 220-L may be turned on or off substantially simultaneously.

The light emitting devices 220-L of the second group are alternately arranged with the first group of light emitting devices 210-L. When the light emitting devices 220-L of the second group are alternately arranged with the light emitting devices 210-L of the first group, light may be uniformly provided to the display panel 100 even with a reduced total number of light emitting devices.

Referring to back FIG. 1, the optical member 300 is disposed under the display panel 100. The optical member 300 receives light from the light emitting unit 200. The optical member 300 improves optical characteristics of light provided to the display panel 100. The optical member 300 may be a diffusion sheet. The optical member 300 may further include a prism sheet or a protective sheet.

The optical member supporters 400 are disposed in a line between the first group of light emitting devices 210-L and the second group of light emitting devices 220-L and under the optical member 300 to support the optical member 300. A plurality of optical member supporters 400 may be provided. The optical member supporters 400 are arranged at regular intervals.

An optical member supporter 400 may be formed of a transparent material to transmit light from the light emitting devices 200-L, which surround each optical member supporter 400. For example, an optical member supporter 400 may be formed of a transparent plastic, such as polycarbonate. The term of "transparent" is used to indicate a transmittance of about 85% or more.

The first protective member 500B and the second protective member 500U are coupled to each other. The first protective member 500B and the second protective member 500U are formed of a metal or plastic material.

The first protective member 500B is disposed under the display panel 100 to accommodate the light emitting unit 200 therein. The first protective member 500B includes a bottom 500B-10 and a plurality of sidewalls 500B-20 bent and extended from sides of the bottom 500B.

The light emitting unit 200 is mounted on the bottom 500B-10 of the first protective member 500B. In addition, a reflective sheet RS (see FIG. 3) is disposed on the bottom 500B-10. According to embodiments, a reflective material is coated on the bottom 500B-10.

The second protective member 500U is disposed on the display panel 100 to cover an edge of the display panel 100. The second protective member 500U is provided with an opening 500U-OP formed therethrough, through which the image passes. The opening 500U-OP corresponds to the display area of the display panel 100.

As shown in FIG. 3, each optical member supporter 400 is coupled with the first protective member 500B. A portion of an optical member supporter 400 is inserted into a first thru-hole 500B-OP formed through the bottom 500B-10. That is, the position of an optical member supporter 400 is determined by the position of a first thru-hole 500B-OP, and the number of the first thru-holes 500B-OP is equal to or greater than the number of the optical member supporters 400.

The reflective sheet RS is disposed on the bottom 500B-10. The reflective sheet RS includes a second thru-hole RS-OP formed therethrough to correspond to the first thru-hole 500B-OP. A portion of the optical member supporter 400 is inserted into the first thru-hole 500B-OP and the second thru-hole RS-OP.

Hereinafter, an optical member supporter will be described in detail with reference to FIGS. 4A to 4E.

Figure 4A:
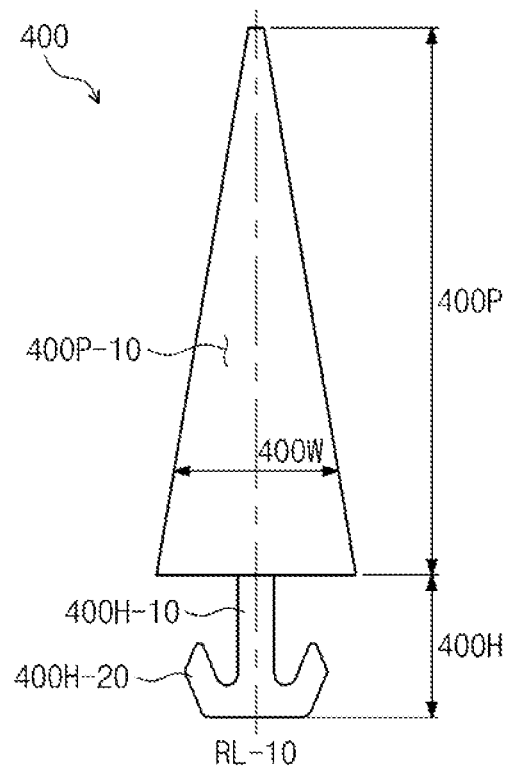
FIGS. 4A to 4E are views of a transparent optical member supporter shown in FIG. 1.
Figure 4B:
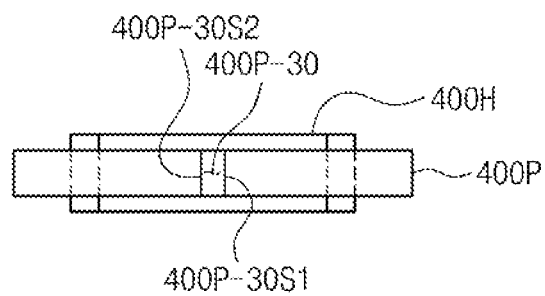
Figure 4C:
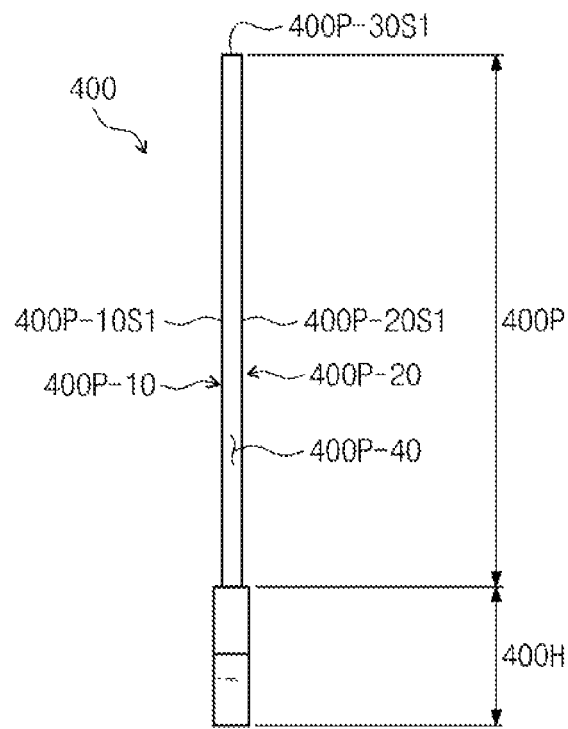
Figure 4D:
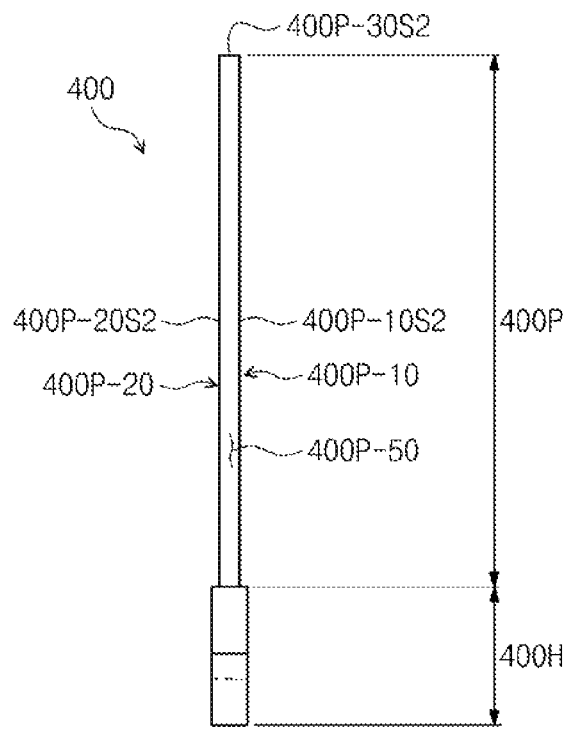
Figure 4E:
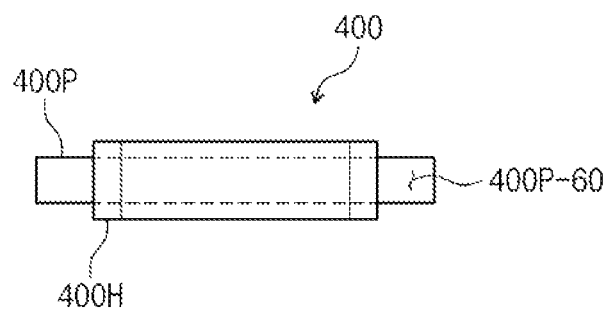

FIGS. 4A to 4E are views of an optical member supporter shown in FIG. 1. FIG. 4A is a front view of the optical member supporter, FIG. 4B is a top view of the optical member supporter, FIGS. 4C and 4D are side views of the optical member supporter, and FIG. 4E is a bottom view of the optical member supporter.

An optical member supporter 400 includes a hook portion 400H fixed to the first protective member 500B and a plate portion 400P that extends from the hook portion 400H. The hook portion 400H and the plate portion 400P are integrally formed by a molding method.

The hook portion 400H is inserted into the first thru-hole 500B-OP and the second thru-hole RS-OP as shown in FIG. 3. The hook portion 400H includes an insert axis 400H-10 and a latch 400H-20 that is disposed on an outer surface of the bottom 500B-10 after passing through the first thru-hole 500B-OP and the second thru-hole RS-OP.

The latch 400H-20 may have various shapes. For example, the latch 400H-2 may have a globular shape or a poly-pyramid shape connected to an end portion of the insert axis 400H-10. The latch 400H-20 passes through the first thru-hole 500B-OP and the second thru-hole RS-OP by a forced press-in method, and then disposes itself on the outer surface of the first protective member 500B.

The plate portion 400P substantially supports the optical member 300. In addition, the plate portion 400P receives light from the light emitting unit 200. The plate portion 400P may be a plate-shaped member with a predetermined thickness. The plate portion 400P includes a first surface 400P-10 facing one of the four light emitting devices and a second surface 400P-20 facing another of the four light emitting devices, and is diagonally disposed with respect to the light emitting devices 200-L. The first surface 400P-10 and the second surface 400P-20 have the same shape.

The plate portion 400P has a width 400W that gradually decreases with increasing distance from an imaginary line RL-10 at a distal end of the hook portion 400H. That is, the width 400W of the first surface 400P-10 and the second surface 400P-20 decreases with increasing distance of the plate portion 400P from the hook portion 400H.

As shown in FIG. 4A, the first surface 400P-10 and the second surface 400P-20 may each be an isosceles trapezoid, but should not be limited thereto. For example, the first surface 400P-10 and the second surface 400P-20 may each be an isosceles triangle. In addition, sides of the first surface 400P-10 and the second surface 400P-20 may be curved.

In addition, the plate portion 400P further includes connection surfaces to connect the first surface 400P-10 and the second surface 400P-20. Four connection surfaces 400P-30, 400P-40, 400P-50, and 400P-60 have been shown in FIGS. 4A to 4E, but the number of the connection surfaces is not limited to four.

Referring to FIG. 4B, connection surface 400P-30 of the plate portion 400P is also a support surface that contacts a lower surface of the optical member 300. The plate portion 400P makes surface-contact with the optical member 300 through the connection surface 400P-30 as shown in FIG. 3. An area of a contact surface between the optical member 300 and the connection surface 400P-30 is identical to a area of the connection surface 400P-30. The area of the contact surface is larger than an area of a contact surface defined by line-contact or dot-contact. Thus, the optical member 300 may be prevented from being damaged.

As shown in FIG. 4C, the plate portion 400P further includes a first side connection surface 400P-40 that connects connection surfaces 400P-30 and 400P-60, and shares an edge 400P-30S1 with the connection surface 400P-30, an edge 400P-10S1 with the first surface 400P-10, and an edge 400P-20S1 with the second surface 400P-20.

Referring to FIG. 4D, the plate portion 400P includes a second side connection surface 400P-50 facing the first side connection surface 400P-40. The second side connection surface 400P-50 also connects connection surfaces 400P-30 and 400P-60, and shares the other edge 400P-30S2 with the connection surface 400P-30, the edge 400P-10S2 with the first surface 400P-10, and the other edge 400P-20S2 with the second surface 400P-20.

In addition, as shown in FIG. 4E, the plate portion 400P includes a bottom connection surface 400P-60 normal to the insert axis 400H-10 of the hook portion 400H. The bottom surface 400P-60 connects the first and second surfaces 400P-10, 400P-20, and the first and second side connection surfaces 400P-40, 400P-50.

Figure 5A:
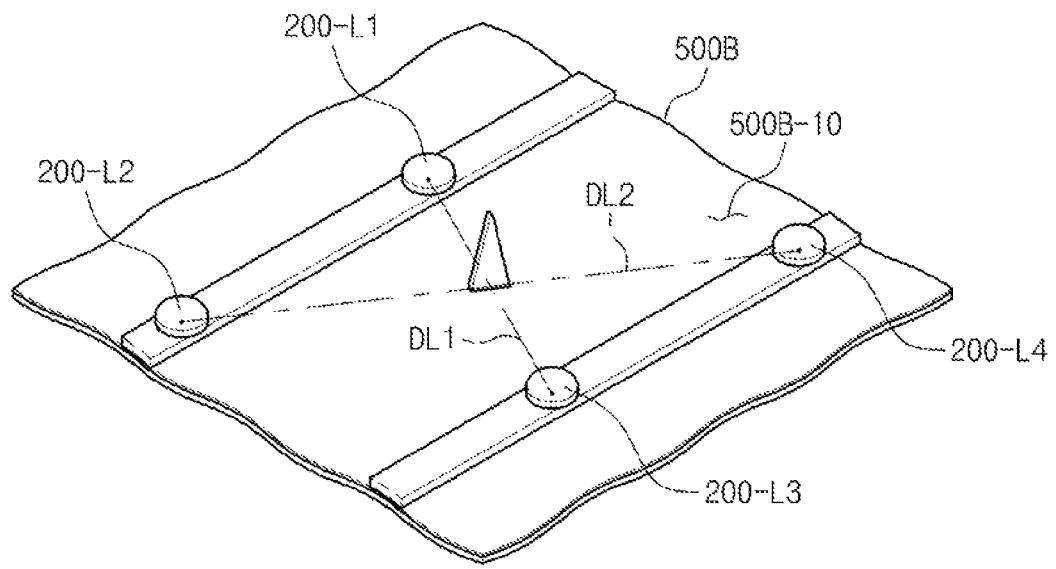
FIG. 5A is a perspective view showing an arrangement relation between the transparent optical member supporter and a plurality of light emitting devices according to an exemplary embodiment of the present disclosure.
Figure 5B:
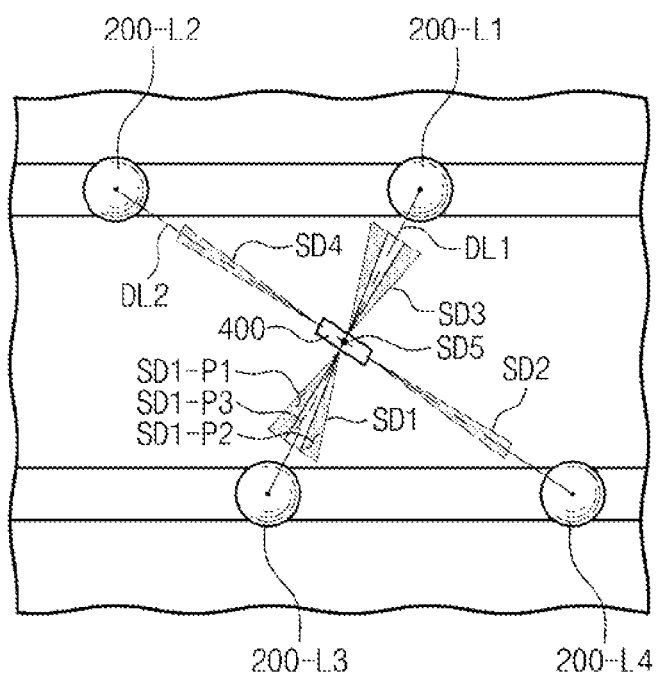
FIG. 5B is a view showing a shadow phenomenon occurring in FIG. 5A.

FIG. 5A is a perspective view showing an arrangement relation between the optical member supporter and a plurality of light emitting devices according to an exemplary embodiment of the present disclosure and FIG. 5B is a view showing a shadow phenomenon occurring in FIG. 5A.

First to fourth light emitting devices 200-L1, 200-L2, 200-L3, and 200-L4 shown in FIG. 5A are located at four vertices of a parallelogram, respectively, and the optical member supporter 400 is located at the center portion of the parallelogram. The parallelogram shape has the smallest area that may be defined by the four light emitting devices of the light emitting devices 210-L and 220-L shown in FIG. 2.

Among the first to fourth light emitting devices 200-L1 to 200-L4, the first and second light emitting devices 200-L1 and 200-L2 are included in the first group light emitting devices 210-L (see FIG. 2) and the third and fourth light emitting devices 200-L3 and 200-L4 are included in the second group light emitting devices 220-L (see FIG. 2).

According to embodiments, the parallelogram defined by the first to fourth light emitting devices 200-L1 to 200-L4 may be a rhombus. The optical member supporter 400 is disposed at the center of the rhombus. The first and third light emitting devices 200-L1 and 200-L3 are disposed at opposite ends of a short diagonal axis DL1 of the rhombus and the second and fourth light emitting devices 200-L2 and 200-L4 are disposed at opposite ends of a long diagonal axis DL2 of the rhombus.

The first and second surfaces 400P-10 and the second surface face the second and fourth light emitting devices 200-L2 and the fourth light emitting device 200-L4, respectively. The first and second surfaces 400P-10 and 400P-20 of the plate portion 400P are aligned parallel to the long diagonal axis DL2 of the rhombus and face the first and third light emitting devices 200-L1 and, respectively. The connection surfaces of the plate portion 400P are disposed on the long diagonal line DL2 in a plan view.

According to an arrangement of the first to fourth light emitting devices 200-L1 to 200-L4 and the plate portion 400P, a shadow phenomenon that occurs around the optical member supporter 400 due to a less than 100% transmittance may be reduced.

Referring to FIG. 5B, first, second, third, and fourth shadow areas SD1, SD2, SD3, and SD4 occur opposite to the first to fourth light emitting devices 200-L1 to 200-L4 with respect to the optical member supporter 400. In addition, a fifth shadow area SD5 occurs at a vertex of the optical member supporter 400.

The first and third shadow areas SD1 and SD3 are disposed along the short diagonal axis DL1 by the first and second surfaces 400P-10 and 400P-20 of the plate portion 400P.

The shape of the plate portion 400P correlates with the brightness pattern of the various portions of the first and third shadow areas SD1 and SD3. In detail, the first and third shadow areas SD1 and SD3 occur adjacent to the first surface 400P-10 and the second surface 400P-20.

Furthermore, each of the first and third shadow areas SD1 and SD3 may be a sum of shadows generated by the sides of the first and second surfaces 400P-10 and 400P-20. For example, a first area SD1-P1 of the first shadow area SD1 occurs due to edges 400P-10S1 and 400P-20S1 of the first and second surfaces 400P-10 and 400P-20, and a second area SD1-P2 of the first shadow area SD1 occurs due to edges 400P-10S2 and 400P-20S2 of the first and second surfaces 400P-10 and 400P-20. A third area SD1-P3 of the first shadow area SD1, which is brighter than the first area SD1-P1 and the second area SD1-P2, occurs between the first area SD1-P1 and the second area SD1-P2. The third shadow area SD3 has a similar structure.

The shape of the plate portion 400P, in which the width 400W decreases with increasing distance from the hook portion 400H on the imaginary line RL-10, prevents the first area SD1-P1 from overlapping the second area SD1-P2, which brightens the first shadow area SD1 and the third shadow area SD3.

The second shadow area SD2 and the fourth shadow area SD4 disposed along the long diagonal axis DL2 occur due to light generated by the second light emitting device 200-L2 and the fourth light emitting device 200-L4 passing through the first side connection surface 400P-40 and the second side connection surface 400P-50 of the plate portion 400P.

The second and fourth shadow areas SD2 and SD4 each have a smaller area than that of each of the first and third shadow areas SD1 and SD3. In addition, since a distance between the first side connection surface 400P-40 and the second light emitting device 200-L2 (or a distance between the second connection side surface 400P-50 and the fourth light emitting device 200-L4) is greater than a distance between the first surface 400P-10 and third light emitting device 200-L3 (or a distance between the second surface 400P-20 and first light emitting device 200-L1), the amount of light incident into the first side surface 400P-40 and the second side surface 400P-50 is relatively small compared to the amount of light incident on the first surface 400P-10 and the second surface 400P-20. Therefore, the second shadow area SD2 and the fourth shadow area SD4 are brighter than the first shadow area SD1 and the third shadow area SD3.

When optical member supporter 400 is aligned so that first and second surfaces 400P-10 and 400P-20 are parallel with the long diagonal axis DL2, the area of the first to fourth shadow areas SD1 to SD4 is minimized.

In addition, since the plate portion 400P is thin, most light incident into the first surface 400P-10 and the second surface 400P-20 passes through the plate portion 400P. Thus, the first and third shadow areas SD1 and SD3 have a brightness pattern substantially similar to that of an area not the shadow area.

A cylindrical-shaped optical member supporter can serve as a cylindrical lens to cause a bright line, but an optical member supporter 400 does not have such an effect. As described above, the brightness patterns of the first to fourth shadow areas SD1 to SD4 are such that light may be more uniformly incident into the optical member 300 regardless of the area of the optical member 300. The display panel 100 receives a more uniform light from the optical member 300. Thus, the image displayed in the display panel 100 may be improved.

Figure 6A:
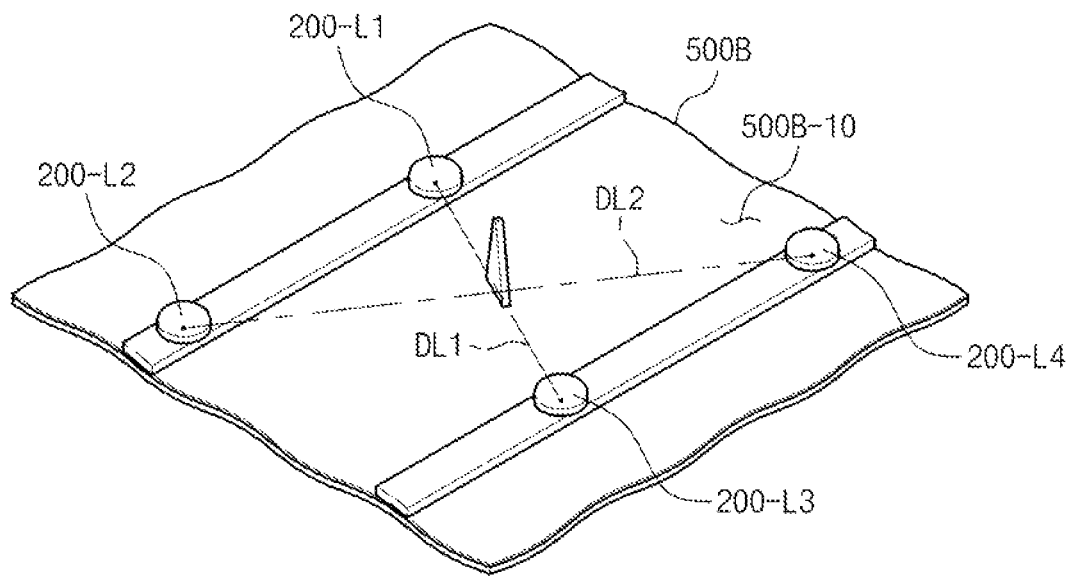
FIG. 6A is a perspective view showing an arrangement relation between the transparent optical member supporter and a plurality of light emitting devices according to an exemplary embodiment of the present disclosure.
Figure 6B:
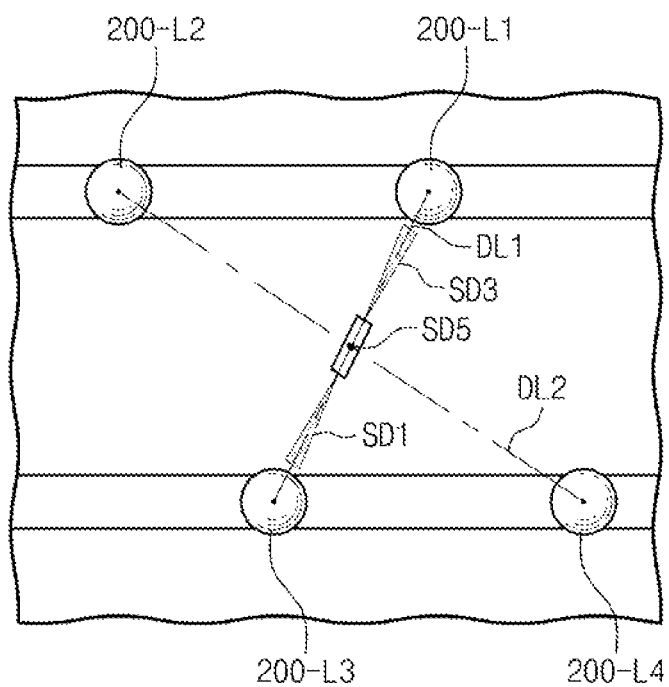
FIG. 6B is a view showing a shadow phenomenon occurring in FIG. 6A.

FIG. 6A is a perspective view showing an arrangement relation between the optical member supporter and a plurality of light emitting devices according to an exemplary embodiment of the present disclosure and FIG. 6B is a view showing a shadow phenomenon occurring in FIG. 6A.

First to fourth light emitting devices 200-L1, 200-L2, 200-L3, and 200-L4 shown in FIG. 6A are located at four vertices of a parallelogram, respectively, and the optical member supporter 400 is located at a center of the parallelogram. The parallelogram defined by the first to fourth light emitting devices 200-L1 to 200-L4 may be a rhombus.

The first and third light emitting devices 200-L1 and 200-L3 are disposed on the short diagonal axis DL1 of the rhombus and the second and fourth light emitting devices 200-L2 and 200-L4 are disposed on the long diagonal axis DL2 of the rhombus.

The first and second surfaces 400P-10 and 400P-20 of the plate portion 400P are aligned parallel to the short diagonal axis DL1 of the rhombus and face the second and fourth light emitting devices 200-L2 and 200-L4, respectively.

As shown in FIG. 6B, the first shadow area SD1 and the third shadow area SD3 occur opposite to the first light emitting device 200-L1 and the third light emitting device 200-L3 with respect to the optical member supporter 400. In addition, the fifth shadow area SD5 occurs on a vertex of the optical member supporter 400.

Since the second light emitting device 200-L2, the optical member supporter 40, and the fourth light emitting device 200-L4 are disposed along the long diagonal axis DL2 of the rhomboid, a distance between the second light emitting device 200-L2 and the optical member supporter 400 (or a distance between the fourth light emitting device 200-L4 and the optical member supporter 400) is relatively large, and the amount of light incident into the first side surface 400P-40 and the second side surface 400P-50 is relatively small. In addition, most light incident into the first surface 400P-10 and the second surface 400P-20 passes through the plate portion 400P. Accordingly, a shadow area does not occur along the long diagonal axis DL2.

The first and third shadow areas SD1 and SD3 disposed on the short diagonal axis DL1 are narrow, and the brightness patterns of the first and third shadow areas SD1 and SD3 shown in FIG. 6B correspond to the brightness patterns of the first and third shadow areas SD1 and SD3 shown in FIG. 5B.

Consequently, the shadow area may reduced by aligning the first and second surfaces 400P-10 and 400P-20 of the plate portion 400P to be parallel with the short diagonal axis DL1.

Figure 7A:
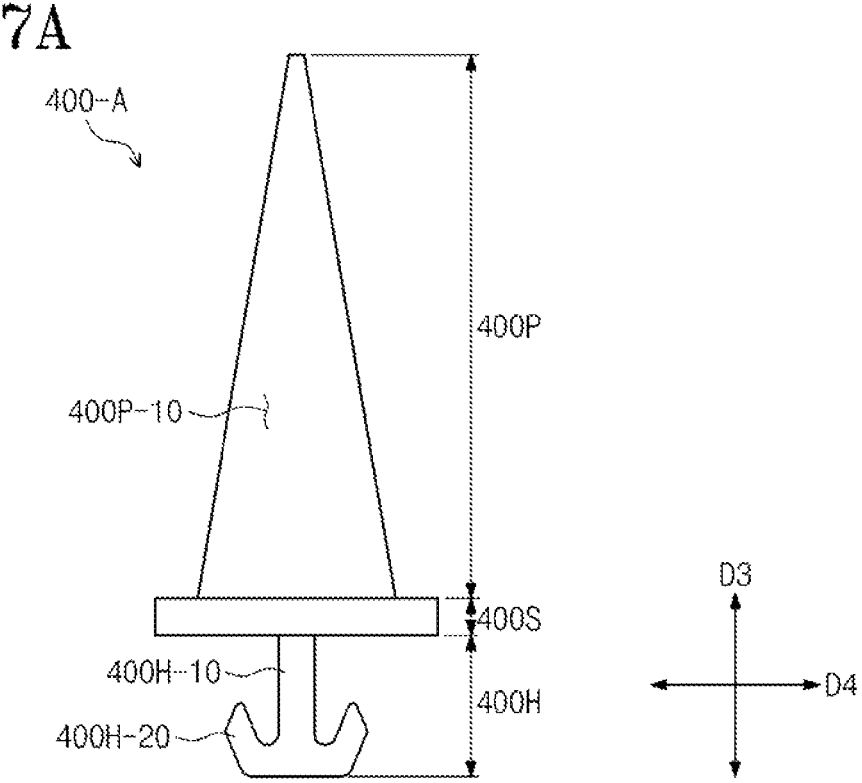
FIGS. 7A to 7C are views of a transparent optical member supporter according to another exemplary embodiment of the present disclosure.
Figure 7B:
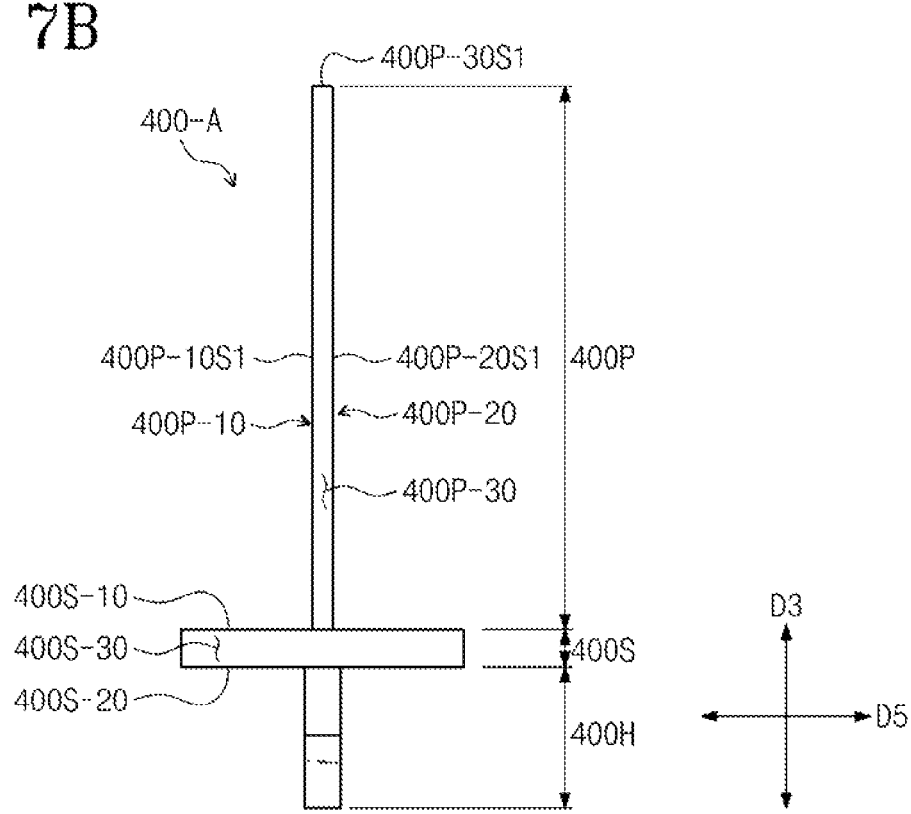
Figure 7C:
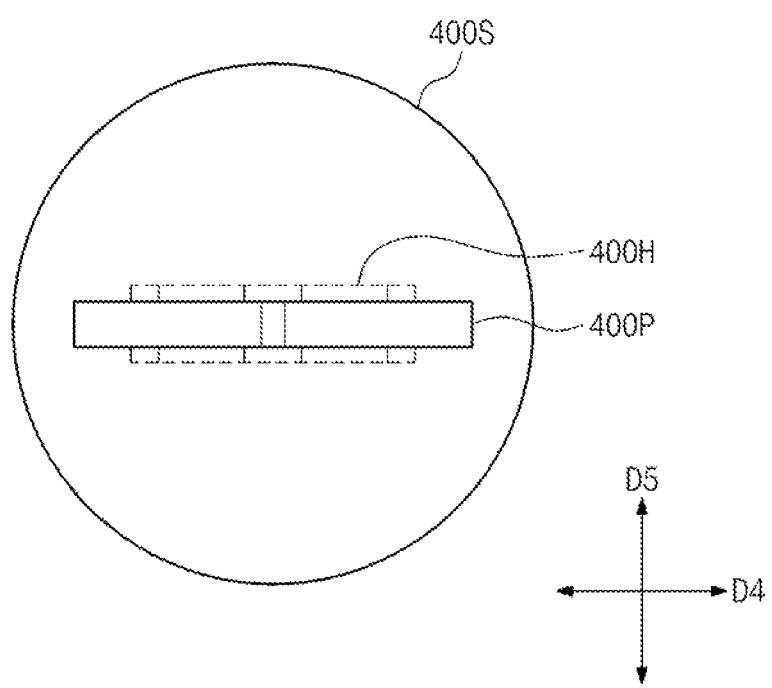

FIGS. 7A to 7C are views of an optical member supporter according to another exemplary embodiment of the present disclosure. FIG. 7A is a front view of the optical member supporter, FIG. 7B is a side view of the optical member supporter, and FIG. 7C is a top view of the optical member supporter.

The optical member supporter 400-A shown in FIGS. 7A to 7C further includes a supporter portion 400S lacking from the optical member supporter 400 described with reference to FIGS. 4A to 4E.

The supporter portion 400S extends in directions D4 and D5 substantially perpendicular to a direction D3 in which the hook portion 400H extends. That is, the hook portion 400H is normal to a plane of the supporter portion 400S. When the hook portion 400H is inserted into the first thru-hole 500B-OP (see FIG. 3) formed through the bottom 500B-10 of the first protective member 500B, the supporter portion 400S supports the optical member supporter 400-A on the bottom 500B-10.

The supporter portion 400S is disposed on the bottom 500B-10 (see FIG. 3). FIGS. 7A to 7C show a disk-like shaped supporter portion 400S. The disk-like shaped supporter portion 400S includes an upper surface 400S-10, a lower surface 400S-20, and a side surface 400S-30 that connects the upper surface 400S-10 and the lower surface 400S-20.

The lower surface 400S-20 of the supporter portion 400S is disposed on the reflective sheet RS (see FIG. 3). The disk-like shaped supporter portion 400S presses the reflective sheet RS onto the bottom 500B-10.

In addition, the shape of the supporter portion 400S may vary. The supporter portion 400S may have a polygonal shape on the bottom 500B-10. In addition, the supporter portion 400S may include a plurality of branches.

Figure 8:
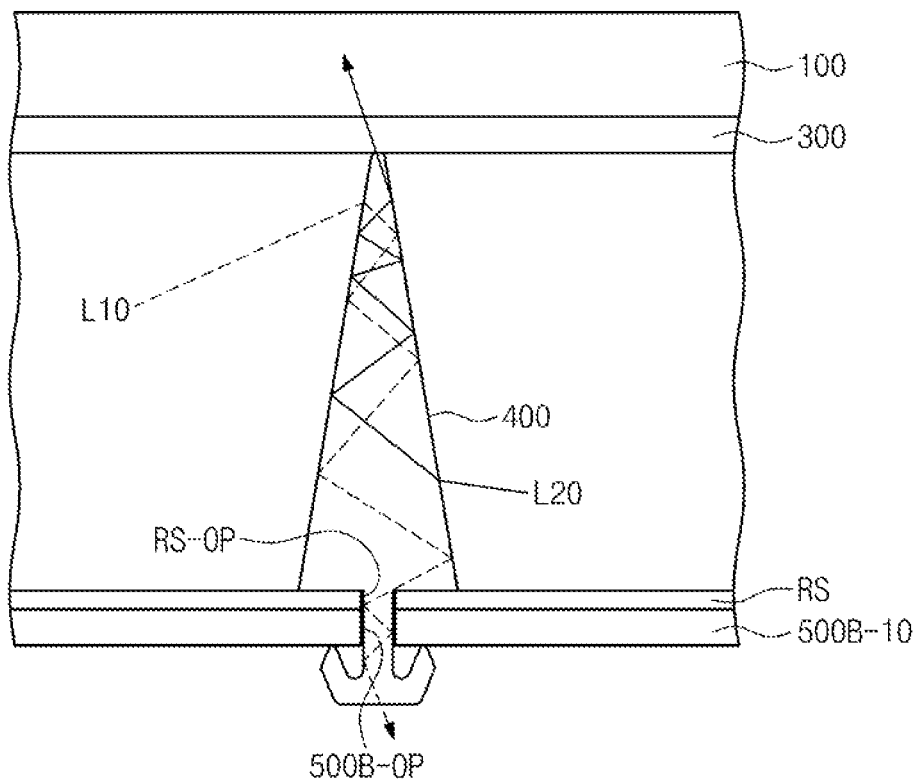
FIG. 8 illustrates a propagation path of the light incident into the transparent optical member supporter.

FIG. 8 illustrates a propagation path of light incident into the optical member supporter. The reason why the fifth shadow area SD5 shown in FIGS. 5B and 6B occurs will be described with reference to FIG. 8.

Referring to FIG. 8, a beam L10 of light incident into the optical member supporter 400 is reflected inside the plate portion 400P and propagates to the hook portion 400H, and then exits out of the first protective member 500B. Another beam L20 of light incident into the optical member supporter 400 is reflected inside the plate portion 400P and propagates to the support surface 400P-30, and then exits from the plate portion 400.

Since some light incident into the optical member supporter 400 exits from the first protective member 500B, e.g., beam L10, brightness on the support surface 400P-30, which corresponds to the vertex of the optical member supporter 400, is lower than that around of the optical member supporter 400.

Figure 9A:
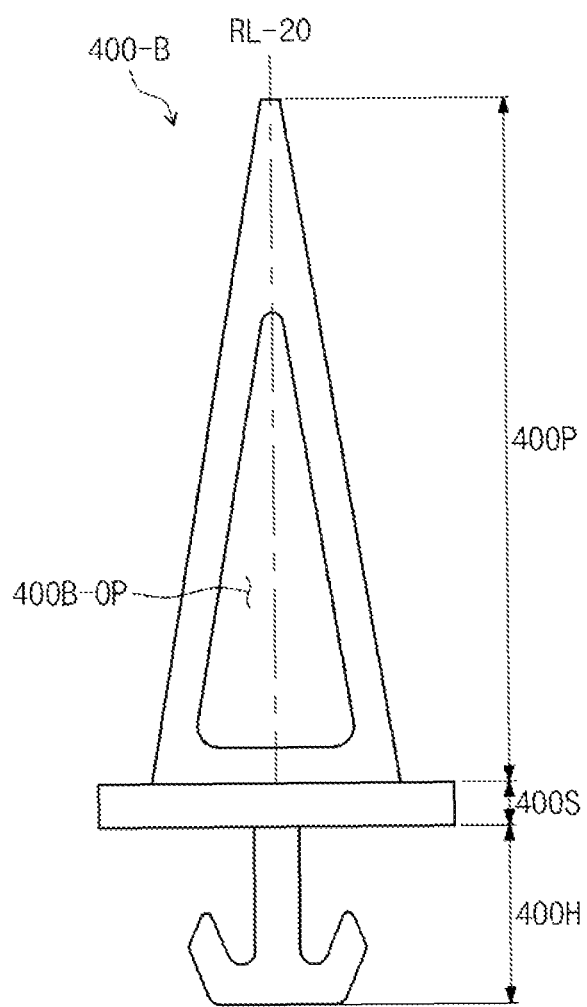
FIGS. 9A to 9C are views of transparent optical member supporters according to other exemplary embodiments of the present disclosure.
Figure 9B:
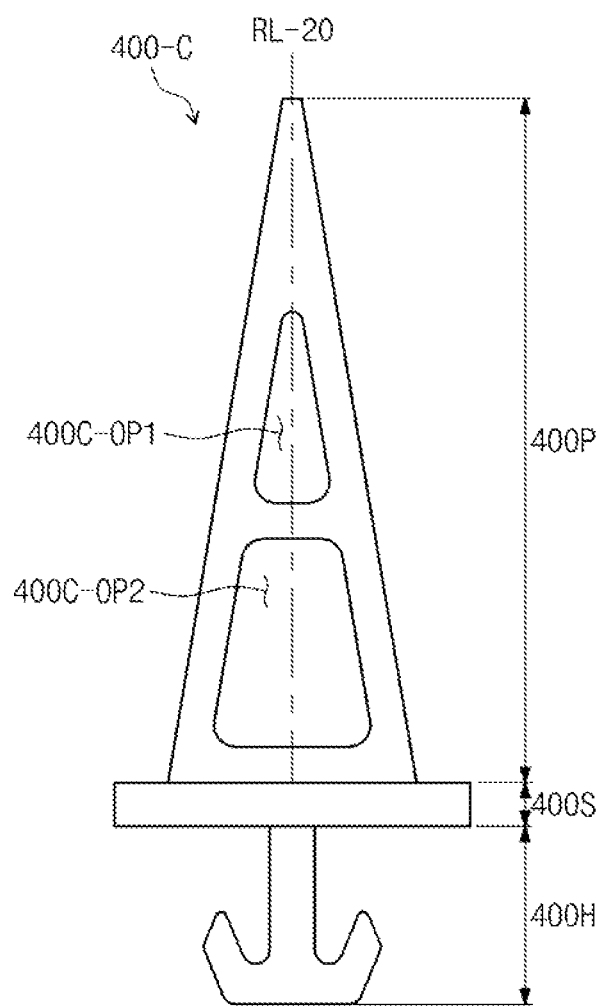
Figure 9C:
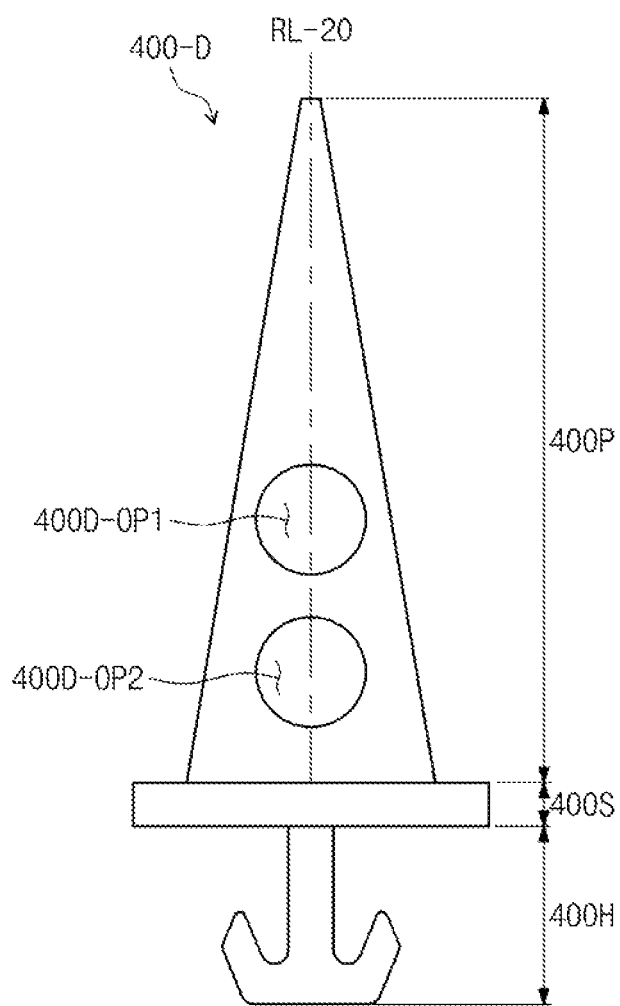

FIGS. 9A to 9C are views of optical member supporters according to other exemplary embodiments of the present disclosure. Optical member supporters 400-B, 400-C, and 400-D shown in FIGS. 9A to 9C remove or reduce the fifth shadow area SD5.

Each of the optical member supporters 400-B, 400-C, and 400-D includes at least one opening formed through the first surface 400P-10 and the second surface 400P-20. In addition, each of the optical member supporters 400-B, 400-C, and 400-D may include the supporter portion 400S, but the optical member supporters should not be limited thereto. That is, the supporter portion 400S may be omitted from the optical member supporters 400-B, 400-C, and 400-D.

The optical member supporter 400-B shown in FIG. 9A includes one opening 400B-OP formed through the plate portion 400P. The optical member supporter 400-C shown in FIG. 9B includes two openings 400C-OP1 and 400C-OP2. The two openings 400C-OP1 and 400C-OP2 are obtained by dividing the opening 400B-OP shown in FIG. 9A into two openings. The optical member supporter 400-D shown in FIG. 9C includes two openings 400D-OP1 and 400D-OP2 each having a circular shape.

The openings formed in the optical member supporters 400-B, 400-C, and 400-D block an optical path through which the light beam L10 (see FIG. 8) propagates to the hook portion 400H. That is, the optical member supporters 400-B, 400-C, and 400-D block light from exiting the first protective member 500B, thus brightening the fifth shadow area SD5.

To effectively block the optical path, the openings 400B-OP, 400C-OP1, 400C-OP2, 400D-OP1, and 400D-OP2 of the optical member supporters 400B to 400D are disposed symmetrically about an imaginary line RL-20 that divides the first surface 400P-10 and the second surface 400P-20 into two.

Moreover, the openings 400B-OP, 400C-OP1, 400C-OP2, 400D-OP1, and 400D-OP2 enhance the transmittance of light incident into the plate portion 400P, and thus reducing the area of the first and third shadow areas SD1 and SD3 (see FIGS. 5B and 6B).

Figure 10A:
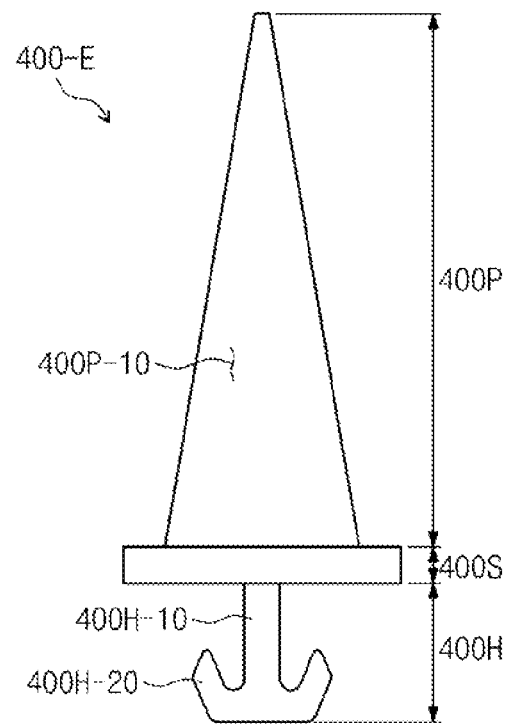
FIGS. 10A to 10C are views of a transparent optical member supporter according to another exemplary embodiment of the present disclosure.
Figure 10B:
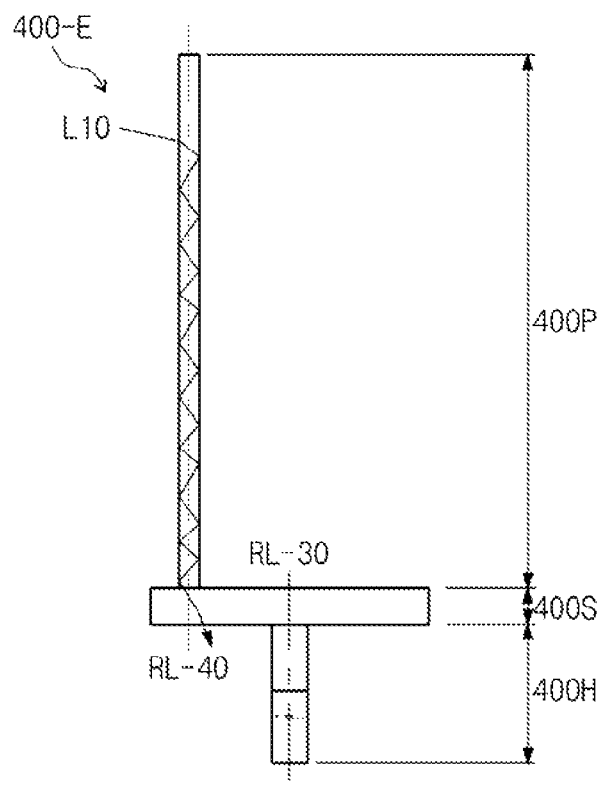
Figure 10C:
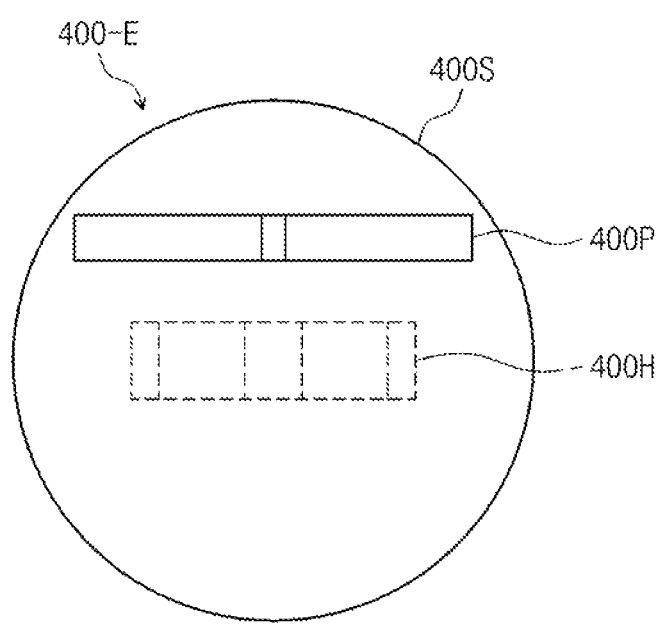

FIGS. 10A to 10C are views of an optical member supporter according to another exemplary embodiment of the present disclosure. FIG. 10A is a front view of the optical member supporter, FIG. 10B is a side view of the optical member supporter, and FIG. 10C is a top view of the optical member supporter. Hereinafter, the optical member supporter will be described in detail with reference to FIGS. 10A to 10C.

The optical member supporter 400-E shown in FIGS. 10A to 10C changes an optical path of light incident into the plate portion 400P. When the optical path of the light beam L10 propagating to the hook portion 400H is cut off by the supporter portion 400P, the fifth shadow area SD5 is brightened.

In the optical member supporter 400-E, an imaginary line RL-30 extending from the hook portion 400H and an imaginary line RL 40 extending from the plate portion 400P are offset from each other with respect to the supporter portion 400S.

The hook portion 400H is located at a center of the supporter portion 400S and the plate portion 400P is offset from the center of the supporter portion 400S.

Although the light beam L10 (see FIG. 8) incident into the plate portion 400P propagates to the hook portion 400H, light beam L10 exits through the supporter portion 400S without reaching the hook portion 400H. The light exiting through the supporter portion 400S is reflected by the reflective sheet RS (see FIG. 3) and propagates to the optical member 300, reducing the amount of light that escapes from the first protective member 500B.

Although the exemplary embodiments of the present disclosure have been described, it is understood that the present disclosure should not be limited to these exemplary embodiments but various changes and modifications can be made by one of ordinary skill in the art within the spirit and scope of the present disclosure as hereinafter claimed.

What is claimed is:

1. A display device comprising:
    an optical member;
    a first light emitting unit disposed under the optical member and that includes a plurality of first light emitting devices arranged in a single line and in a first direction;
    a second light emitting unit disposed under the optical member and that includes a plurality of second light emitting devices arranged in a single line and in the first direction, the plurality of second light emitting devices are alternately disposed with respect to the first light emitting devices;
    a protective member that accommodates the first light emitting unit and the second light emitting units; and
    a plurality of transparent optical member supporters arranged in a line extending in the first direction between the first light emitting unit and the second light emitting unit, wherein each transparent optical member supporter is positioned at a center of a smallest quadrangle defined by two adjacent first light emitting devices of the first light emitting unit and two adjacent second light emitting devices of the second light emitting unit, each transparent optical member supporter comprising:
        a hook portion fixed to the protective member; and
        a plate portion extended from the hook portion and including a flat first surface facing one of the first light emitting devices of the first light emitting unit, a flat second surface facing one of the second light emitting devices of the second light emitting unit located at a diagonal position with respect to the one of the first light emitting devices, and connection surfaces connecting the flat first surface and the flat second surface,
        wherein the flat first surface and the flat second surface are aligned parallel with an axis of a long diagonal axis of the smallest quadrangle or a short diagonal axis of the smallest quadrangle in a top view.

2. The display device of claim 1, wherein a width of each of the flat first and second surfaces decreases with increasing distance from the hook portion.

3. The display device of claim 1, wherein the smallest quadrangle is a parallelogram.

4. The display device of claim 3, wherein the parallelogram is a rhombus.

5. The display device of claim 1, wherein the plate portion comprises at least one opening formed through the flat first surface and the flat second surface.

6. The display device of claim 5, wherein the at least one opening is disposed symmetrically about an imaginary line that divides the flat first surface and the flat second surface into two.

7. The display device of claim 1, wherein the protective member comprises a first thru-hole into which the hook portion is inserted.

8. The display device of claim 1, wherein the transparent optical member supporter further comprises a supporter portion disposed on the surface of the protective member, wherein the hook portion extends in a direction normal to a plane of the supporter portion.

9. The display device of claim 8, wherein the supporter portion has one of a circular shape or a polygonal shape on the surface of the protective member.

10. The display device of claim 8, wherein the hook portion and the plate portion are offset from each other with respect to the supporter portion.

11. The display device of claim 8, wherein the hook portion is located at a center of the supporter portion.

12. A display device, comprising:
    a protective member;
    a first light emitting unit disposed in the protective member and that includes a plurality of first light emitting devices arranged in a single line and in a first direction;
    a second light emitting unit disposed in the protective member spaced apart from the first light emitting unit and closest to the first light emitting unit and that includes a plurality of second light emitting devices arranged in a single line and in the first direction, the second light emitting devices alternately arranged with the first light emitting devices; and
    a plurality of transparent optical member supporters fixed to the protective member in a line parallel to and between the first light emitting unit and the second light emitting unit,
    wherein each transparent optical member supporter is positioned at a center of a smallest parallelogram defined by two adjacent first light emitting devices of the first light emitting unit and two adjacent second light emitting devices of the second light emitting unit, and
    wherein each transparent optical member supporter includes a flat first surface that faces one of the first light emitting devices of the first light emitting unit, a flat second surface opposite to the flat first surface that faces one of the second light emitting devices of the second light emitting unit, and connection surfaces connecting the flat first surface and the flat second surface,
    wherein the flat first surface and the flat second surface are aligned parallel with an axis of a long diagonal axis of the smallest parallelogram or a short diagonal axis of the smallest parallelogram in a top view.

13. The display device of claim 12, wherein the smallest quadrangle is a parallelogram.

14. The display device of claim 13, wherein the parallelogram is a rhombus.

15. The display device of claim 12, wherein each transparent optical member supporter includes a plate portion having the flat first and second surfaces, and a hook portion that extends from the plate portion through a bottom of the protective member.

16. The display device of claim 15, wherein a width of the plate portion decreases with increasing distance from the hook portion.

17. The display device of claim 12, further comprising:
    an optical member supported by the plurality of transparent optical member supporters, and a display panel disposed on the optical member.

18. A display device comprising:
    an optical member;
    a plurality of light emitting units extended in a first direction and arranged in a second direction crossing the first direction, the plurality of light emitting units includes a first light emitting unit and a second light emitting unit closest to the first light emitting unit of the plurality of light emitting units;
    a protective member that accommodates the plurality of light emitting units; and a transparent optical member supporter supporting the optical member, the transparent optical member supporter comprising:
  a hook portion fixed to the protective member; and
  a plate portion extended from the hook portion and including a flat first surface, a flat second surface, and connection surfaces connecting the flat first surface and the flat second surface,
wherein the first light emitting unit is disposed under the optical member and includes a plurality of first light emitting devices arranged in a line,
the second light emitting unit is disposed under the optical member and includes a plurality of second light emitting devices arranged in a line, the plurality of second light emitting devices are alternately disposed with respect to the first light emitting devices,
the transparent optical member supporter is positioned at a center of a smallest quadrangle defined by two adjacent first light emitting devices and two adjacent second light emitting devices, and
the flat first surface and the flat second surface are aligned parallel with an axis of a long diagonal axis of the smallest quadrangle or a short diagonal axis of the smallest quadrangle in a top view.

* * * * *